(12) United States Patent
Sugai (10) Patent No.: US 8,956,716 B2
(45) Date of Patent: Feb. 17, 2015

(54) PRINTED MATERIAL AND METHOD FOR MANUFACTURING PRINTED METAL

(75) Inventor: Keigo Sugai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 13/440,030

(22) Filed: Apr. 5, 2012

(65) Prior Publication Data

US 2012/0263926 A1 Oct. 18, 2012

(30) Foreign Application Priority Data

Apr. 12, 2011 (JP) .................................. 2011-087987

(51) Int. Cl.
| | |
|---|---|
| *B32B 3/00* | (2006.01) |
| *B32B 7/14* | (2006.01) |
| *B32B 7/00* | (2006.01) |
| *B05D 1/36* | (2006.01) |
| *B05D 5/00* | (2006.01) |
| *C08G 63/60* | (2006.01) |
| *B41M 5/00* | (2006.01) |

(Continued)

(52) U.S. Cl.
CPC ........... *B41M 5/0023* (2013.01); *B41M 5/0047* (2013.01); *B41M 7/0081* (2013.01); *B41M 7/009* (2013.01); *C09D 11/101* (2013.01); *C09D 11/322* (2013.01)
USPC ........ 428/201; 427/265; 428/195.1; 428/209; 524/599; 524/607

(58) Field of Classification Search
CPC ............. B41M 5/0047; B41M 5/0058; B41M 5/0064; B41M 5/0023; B41M 5/007; B41M 5/00; B41M 7/009; B41M 7/0036; B41M 7/0045; B41M 7/0027; B41M 7/0081; B41M 7/00; B41J 2/01; B41J 3/28; B41J 3/4073; B42D 15/00; C09D 11/322; C09D 11/101; C09D 11/40
USPC .................. 428/201, 162, 182, 207; 427/265; 347/20; 524/599, 607, 612
See application file for complete search history.

(56) References Cited

U.S. PATENT DOCUMENTS

| | | | |
|---|---|---|---|
| 2009/0068418 | A1 | 3/2009 | Iwase et al. |
| 2009/0244116 | A1 | 10/2009 | Ohnishi |
| 2010/0239830 | A1 | 9/2010 | Ohnishi et al. |

FOREIGN PATENT DOCUMENTS

| | | | |
|---|---|---|---|
| JP | 2001-249033 A | | 9/2001 |
| JP | 2001-249033 A | | 9/2001 |

(Continued)

*Primary Examiner* — Mark Ruthkosky
*Assistant Examiner* — Laura C Powers
(74) *Attorney, Agent, or Firm* — Global IP Counselors, LLP (57) ABSTRACT

A printed material includes a first printed layer and a second printed layer. The first printed layer is produced by printing using a first curing ink which is provided in a first processing region for deformation process and contains at least a monofunctional polymerizable compound. The second printed layer is produced by printing using a second curing ink which is provided in a second processing region for shear processing and contains at least a multifunctional polymerizable compound. In the first curing ink, y1/x1 is 0.5 or less, where x1 and y1 are respective masses of the monofunctional polymerizable compound and the multifunctional polymerizable compound in the first curing ink. In the second crying ink, y2/x2 is 1 or greater, where x2 and y2 are respective masses of the monofunctional polymerizable compound and the multifunctional polymerizable compound in the second curing ink.

7 Claims, 4 Drawing Sheets

(51) Int. Cl.
   *B41M 7/00* (2006.01)
   *C09D 11/101* (2014.01)
   *C09D 11/322* (2014.01)

(56) References Cited

FOREIGN PATENT DOCUMENTS

| | | |
|---|---|---|
| JP | 2004-082367 A | 3/2004 |
| JP | 2004-082367 A | 3/2004 |
| JP | 2009-096043 A | 5/2009 |
| JP | 2009-096043 A | 5/2009 |
| JP | 2009-221416 A | 10/2009 |
| JP | 2009-221416 A | 10/2009 |
| JP | 2009-233978 A | 10/2009 |
| JP | 2009-233978 A | 10/2009 |
| JP | 2010-222385 A | 10/2010 |
| JP | 2010-222385 A | 10/2010 |
| JP | 2010-222386 A | 10/2010 |
| JP | 2010-222386 A | 10/2010 |
| JP | 2010-222387 A | 10/2010 |
| JP | 2010-222387 A | 10/2010 |
| JP | 2010-224302 A | 10/2010 |
| JP | 2010-224302 A | 10/2010 |

PRINTED MATERIAL AND METHOD FOR MANUFACTURING PRINTED METAL

CROSS-REFERENCE TO RELATED APPLICATIONS

This application claims priority to Japanese Patent Application No. 2011-087987 filed on Apr. 12, 2011. The entire disclosure of Japanese Patent Application No. 2011-087987 is hereby incorporated herein by reference.

BACKGROUND

1. Technical Field

The present invention relates to a printed material and a printed material manufacturing method.

2. Related Art

With printed materials such as internal components for automobiles or external components for electrical products, the printed material has a base material and a printed layer that has been printed using an ink and is provided on the base material. Holes are formed in this printed material by shear processing such as punching or clipping, and deformation process such as partial elongation involving constricting or bending is then carried out (e.g., refer to Japanese Laid-Open Patent Application Publication No. 2010-224302). Radiation-curing inks such as ultraviolet-curing inks are used as the ink.

However, there are no inks that can form a printed layer that is sufficiently amenable to shear processing and deformation process. Even if a printed layer that is suitable for shear processing can be formed, cracks, breaks, ruptures, and the like can occur in some cases when deformation process is carried out. In addition, even if a printed layer that is suitable for deformation process can be formed, cracks, breaks, and defects can occur in some cases when shear processing is carried out.

SUMMARY

An object of the invention is to provide a printed material and printed material manufacturing method whereby deformation process and shear processing can be favorably performed.

The objectives described above are attained by the present invention described below.

A printed material according to one aspect of the present invention includes a base material, a first printed layer and a second printed layer. The base material has a first processing region where deformation process is performed and a second processing region where shear processing is performed. The first printed layer is provided in the first processing region on the base material and is imprinted using a first curing ink containing at least a monofunctional polymerizable compound among the monofunctional polymerizable compound and a multifunctional polymerizable compound. The second printed layer is provided in the second processing region on the base material and is imprinted with a second curing ink containing at least a multifunctional polymerizable compound among the multifunctional polymerizable compound and an monofunctional polymerizable compound. In the first curing ink, y1/x1 is 0.5 or less, where x1 and y1 are respective masses of the monofunctional polymerizable compound and the multifunctional polymerizable compound in the first curing ink. In the second curing ink, y2/x2 is 1 or greater, where x2 and y2 are respective masses of the monofunctional polymerizable compound and the multifunctional polymerizable compound in the second curing ink.

As a result, a desirable printed material can be offered wherein deformation process can be favorably carried out in the first processing region, and shear processing can be favorably carried out in the second processing region.

With the printed material according to the above described aspect of the present invention, the first printed layer preferably has a pencil hardness of B or greater.

As a result, deformation process can be favorably carried out in the first processing region.

With the printed material according to the above described aspect of the present invention, the second printed layer preferably has a pencil hardness of H or greater.

As a result, shear processing can be favorably carried out in the second processing region.

With the printed material according to the above described aspect of the present invention, the first processing region has preferably been deformed by the deformation process.

As a result, a printed material can be provided that has been subjected to deformation process.

With the printed material according to the above described aspect of the present invention, the second processing region has preferably been sheared by the shear processing.

As a result, a printed material can be offered that has been subjected shear processing.

With the printed material according to the above described aspect of the present invention, the first curing ink is preferably discharged and supplied as droplets from a nozzle using an ink jet method to form the first printed layer, and the second curing ink is preferably discharged and supplied as droplets from a nozzle using the ink jet method to form the second printed layer.

As a result, a printed material can be provided that has a first printed layer, a second printed layer, and a third printed layer that are formed with high precision.

With the printed material according to the above described aspect of the present invention, the first curing ink and the second curing ink are preferably radiation-curing inks, the first printed layer is preferably obtained by discharging and supplying the first curing ink from a nozzle using an ink jet method, and curing the first curing ink under irradiation with radiation, and the second printed layer is preferably obtained by discharging and supplying the second curing ink from a nozzle using an ink jet method, and curing the second curing ink under irradiation with radiation.

As a result, a printed material can be provided that has a first printed layer, a second printed layer, and a third printed layer that have been formed with high precision.

A printed material manufacturing method according to another aspect of the present invention includes: printing a first printed layer using a first curing ink containing at least a monofunctional polymerizable compound among the monofunctional polymerizable compound and a multifunctional polymerizable compound in a first processing region on a base material, the first processing region being a region to be deformed by deformation process; and printing a second printed layer using a second curing ink containing at least a multifunctional polymerizable compound among the multifunctional polymerizable compound and a monofunctional polymerizable compound in a second processing region on the base material, the second processing region being a region to be sheared by shear process. In the first curing ink, y1/x1 is 0.5 or less, where x1 and y1 are respective masses of the monofunctional polymerizable compound and the multifunctional polymerizable compound in the first curing ink. In the second curing ink, y2/x2 is 1 or greater, where x2 and y2 are respective masses of the monofunctional polymerizable compound and the multifunctional polymerizable compound in the second curing ink.

As a result, deformation process can be favorably carried out in the first processing region, shear processing can be favorably carried out in the second processing region, and a favorable printing material can be provided.

The printed material manufacturing method according to the above described aspect of the present invention preferably further includes performing the deformation process in the first processing region.

As a result, deformation process can be favorably carried out in the first processing region.

The printed material manufacturing method according to the above described aspect of the present invention preferably further includes performing the shear processing in the second processing region.

As a result, shear processing can be favorably carried out in the second processing region.

BRIEF DESCRIPTION OF THE DRAWINGS

Referring now to the attached drawings which form a part of this original disclosure.

DETAILED DESCRIPTION OF EXEMPLARY EMBODIMENTS

The printed material and printed material manufacturing method of the present invention are described in detail below using preferred embodiments presented in the appended drawings.

First Embodiment

Figure 1A:
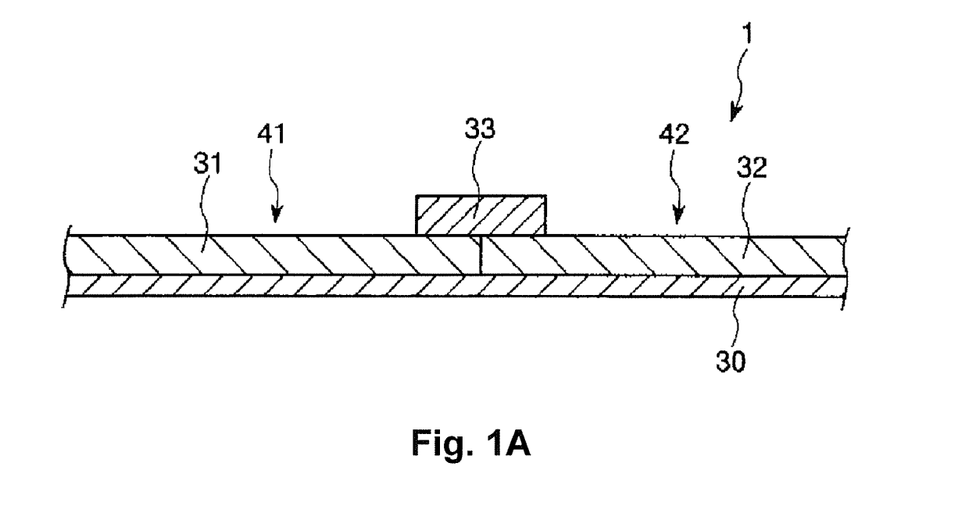
FIGS. 1A and 1B are sectional views showing an embodiment of the printed material of the present invention.
Figure 1B:
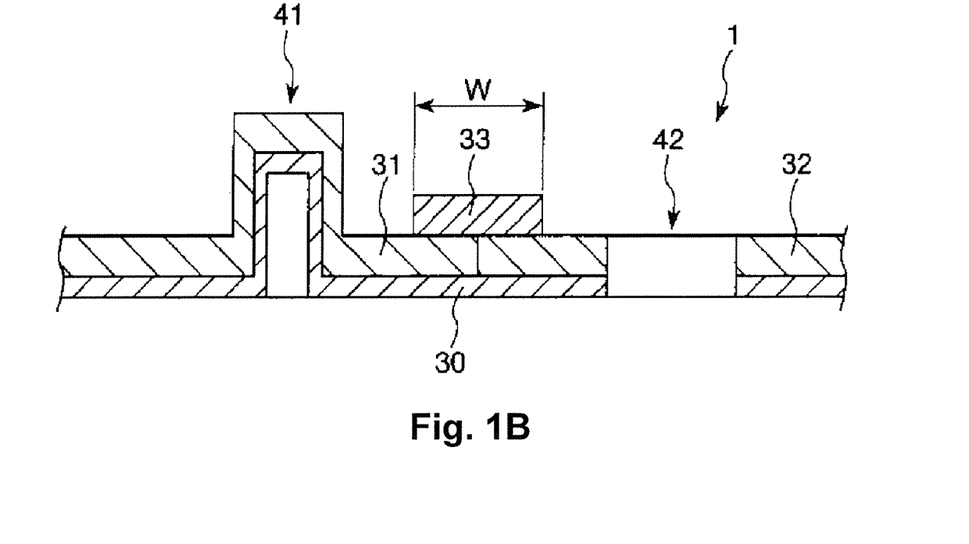
Figure 2:
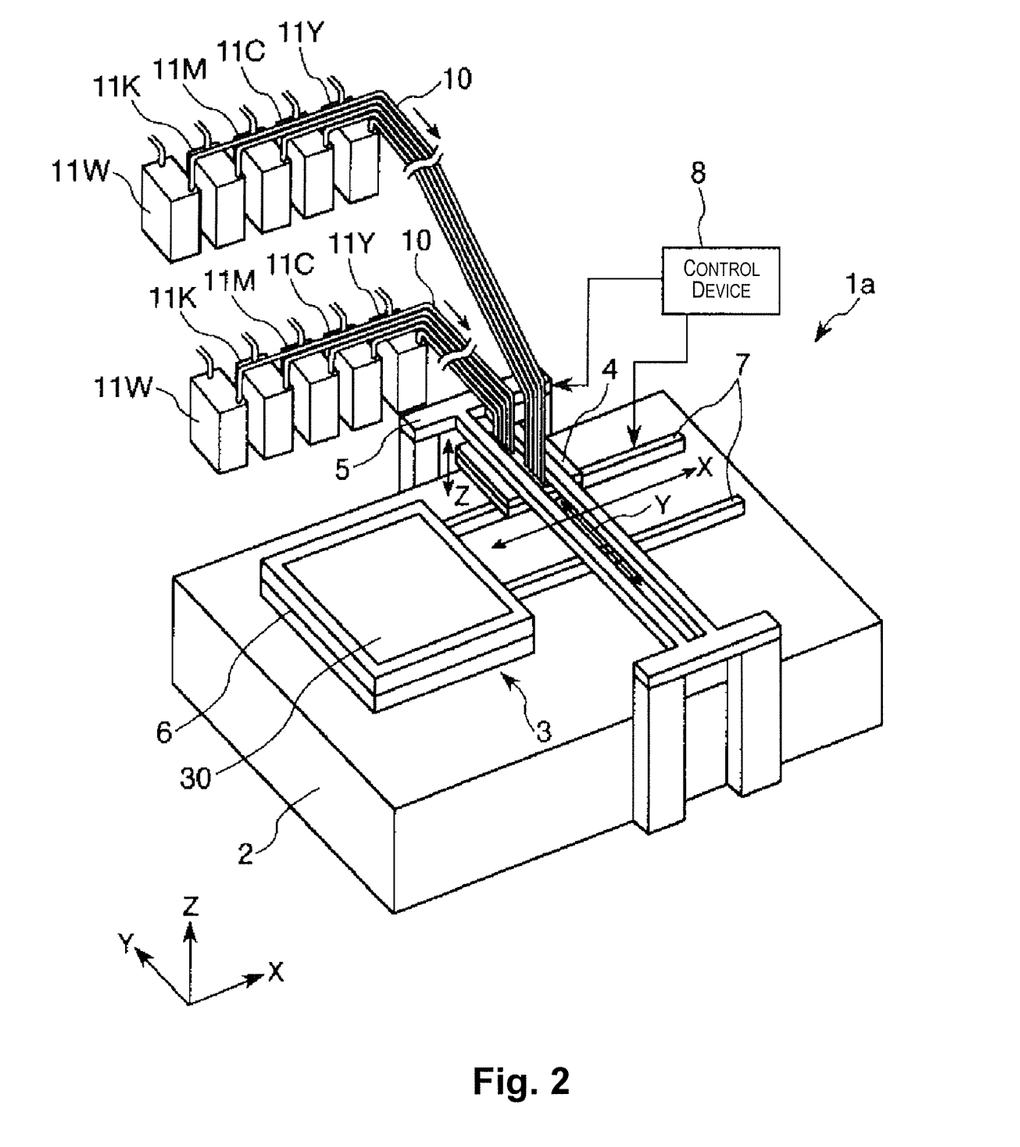
FIG. 2 is a perspective view showing the schematic configuration of the printing device that is used in manufacturing the printed material of the present invention.
Figure 3:
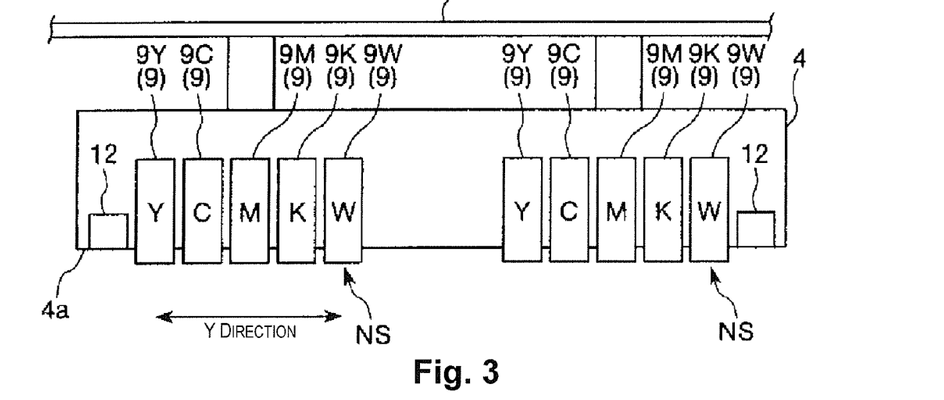
FIG. 3 is a side sectional view showing the schematic configuration of the carriage of the printing device shown in FIG. 2.
Figure 4:
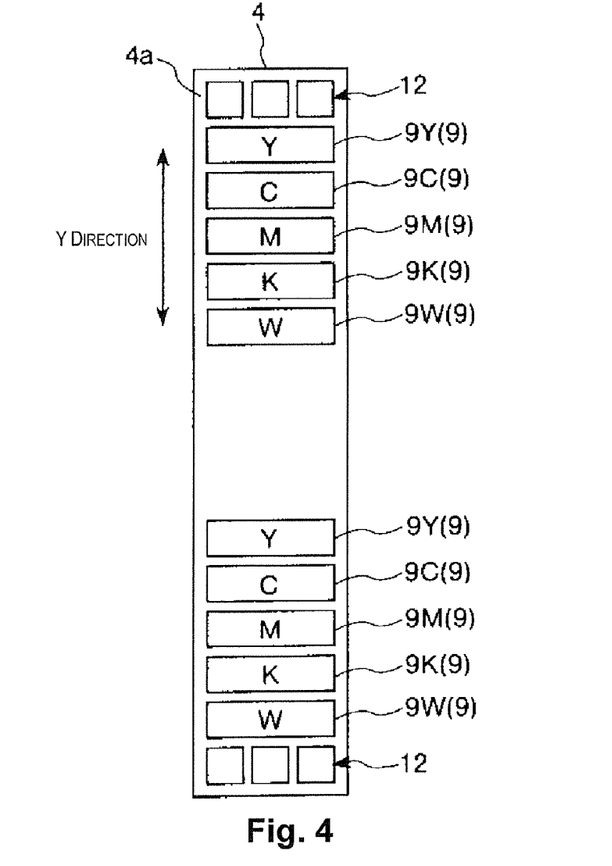
FIG. 4 is a bottom view showing the schematic configuration of the carriage of the printing device shown in FIG. 2.

FIG. 1 is a sectional view showing a first embodiment of the printed material of the present invention. FIG. 1A shows the material prior to carrying out deformation process and shear processing, and FIG. 1B shows the material after deformation process and shear processing. FIG. 2 is a perspective view of the schematic configuration of the printing device that is used in the production of the printed material of the present invention. FIG. 3 is a side sectional view showing the schematic configuration of the carriage of the printing device shown in FIG. 2. FIG. 4 is a bottom view showing the schematic configuration of the carriage of the printing device shown in FIG. 2. FIG. 5 is a schematic configuration diagram of the droplet discharge head.

As shown in FIGS. 1 and 2, the printed material 1 has a base material (substrate) 30; a first printing layer 31 that is printed (formed) using a first ultraviolet-curing ink (first curing ink), and a second printed layer 32 that is printed using a second ultraviolet-curing ink (second curing ink) which are provided in respectively different regions on the base material 30 and which have different characteristics or functionalities, as well as different colors; and a third printed layer 33 that is printed using a first ultraviolet-curing ink (first curing ink), that is provided so as to fill the boundary between the first printed layer 31 and the second printed layer 32, and that has a different color from the first printed layer 31 and the second printed layer 32. The first printed layer 31 is provided in the first processing region 41 which is at a location where work is to be performed for deforming the base material 30, specifically, a location for deformation process, and the second printed layer 32 is provided in the second processing region 42 which is at a location for shear processing.

The first curing ink, the second curing ink, and the third curing ink, in other words, the ink set, will first be described. Each of the first, second, and third curing inks may be curing inks. A typical case is described below in which radiation-curing inks are used.

Ink Set

The ink set that is used in manufacturing, or printing, the printing material 1 has a first ink, a second ink, and a third ink which are radiation-curing inks that contain polymerizable compounds. The first ink, second ink, and third ink each have a polymerization initiator. When the first ink, second ink, and third ink are to be referred to below, the term "ink" or "radiation-curing ink" is generally used. When the first ink, second ink, and third ink are to be distinguished, the terms "first ink", "second ink", "third ink", "first radiation-curing ink", "second radiation-curing ink", and "third radiation-curing ink" are used.

In addition, an ink jet printing ink set is suitable for use as the ink set.

The radiation-curing ink is preferably an ink that cures with high sensitivity in order to form a high-quality image.

By achieving high sensitization with the ink, the ink is endowed with high curing capacity when irradiated with activating radiation. For this reason, the advantages of long life, decreased loads on activating radiation generation devices and decreased power consumption are provided, as well as the advantages of suppressing loss of image strength due to volatilization of uncured low-molecular-weight substances. In addition, an ink in which cracking, breaking, and delaminating do not readily occur in the resulting image (printed material), and an ink that has favorable defect resistance and flexibility in the cured film is desired. Because the cured film has high flexibility and defect resistance, the printed material can be displayed and stored without modification over long periods of time in various environments while maintaining high quality, resulting in additional merits such as easy handling of the printed material.

The first ink contains, as a polymerizable compound, a monofunctional polymerizable compound selected from a monofunctional polymerizable compound ("monofunctional monomer", or "monofunctional polymerizable monomer" below) and a multifunctional polymerizable compound ("multifunctional monomer", "multifunctional polymerizable monomer" below). If a monofunctional polymerizable compound is contained in the ink, then the printed layer will elongate when heated. If a multifunctional polymerizable compound is contained in the ink, then elasticity and solvent resistance will be obtained in the printed layer.

Consequently, because the first ink contains a monofunctional polymerizable compound, deformation process can be carried out in the first processing region 4, and cracking, breaking, rupturing, and the like can be prevented from occurring in the first printed layer 31. It is preferable for the first ink to contain a monofunctional polymerizable compound and a multifunctional polymerizable compound.

The second ink contains, as polymerizable compound, at least a multifunctional polymerizable compound selected from a monofunctional polymerizable compound and a multifunctional polymerizable compound. As a result, when shear processing is carried out in the second processing region 42, cracks, breaks, defects, and the like will be prevented from occurring in the second printed layer 32. The second ink preferably contains a monofunctional polymerizable compound and a multifunctional polymerizable compound.

Taking the mass of the monofunctional polymer compound in the first ink as $x1$, and the mass of the multifunctional polymerizable compound as $y1$, $y1/x1$ is 0.5 or less (including cases where $y1$ is 0, specifically, $y1/x1$ is 0), preferably 0.05 to 0.5, more preferably 0.13 to 0.5, and even more preferably 0.3 to 0.5. If $y1/x1$ is greater than the above upper limit, then the elongation properties of the first printed layer 31 will decline, and cracks, breaks, ruptures, and the like may occur in the first printed layer 31 when deformation process is carried out in the first processing region 41.

If a multifunctional polymerizable compound is contained in the first ink in addition to the monofunctional polymerizable compound, then, in particular, if $y1/x1$ is at or above the lower limit described above, then the first printed layer 31 will have superior solvent resistance. As a result, it will be possible to prevent damage to the first printed layer 31, even in cases where solvent is applied to the first printed layer 31.

In addition, taking the mass of the monofunctional polymer compound in the second ink as $x2$ and the mass of the multifunctional polymerizable compound as $y2$, $y2/x2$ is 1 or greater (including cases where $x2$ is 0, specifically, $y2/x2=$infinity), preferably 1 to 19.8, more preferably 1.9 to 19.8, and even more preferably 5.2 to 10.5.

If $y2/x2$ is smaller than the lower limit, then the elasticity of the first printed layer 31 will decline, and there will be cases where cracks, breaks, defects, or the like arise in the second printed layer 32 when shear processing is carried out in the second processing region 42.

In addition, if $y2/x2$ is too great, then the elasticity of the first printed layer 31 will decline, and cracks, breaks, defects, or the like may occur in the second printed layer 32, depending on other conditions, when shear processing is carried out in the second processing region 42. For this reason, the second printed layer 32 will have suitable elasticity if a monofunctional polymerizable compound is contained in addition to multifunctional polymerizable compound in the second ink, particularly, if $y2/x2$ is at or below the upper limit referred to above. As a result, it is possible to more reliably prevent cracks, breaks, defects, and the like from arising in the second printed layer 32 when shear processing is carried out in the second processing region 42.

With the first ink, second ink, and third ink, the total mass of polymerizable compound in the ink, specifically, the total mass of the monofunctional polymerizable compound and the multifunctional polymerizable compound, is preferably 55 to 95 mass % with respect to the total mass of the ink, with 60 to 90 mass % being preferred. The material will have superior curing properties as well as suitable viscosity when the values are within this range.

In addition, with the first ink, the second ink, and the third ink, the viscosity at 25° C. is preferably 3 to 20 mPa·s, more preferably 5 to 12 mPa·s. As a result, the ink can be discharged using the ink jet method described below.

The pigment concentration (colorant concentration) of the first ink, the second ink, and the third ink are preferably the same. In addition, the viscosities of the first ink, the second ink, and the third ink are preferably approximately the same. In addition, the surface tensions of the first ink, second ink, and third ink are preferably approximately the same.

As described above, the ink is a radiation-curing ink that can be cured by irradiation with activating radiation.

The term "activating radiation (radiation)" used above has a broad meaning that includes ionizing radiation and non-ionizing radiation. Specifically, the term "activating radiation (radiation)" broadly includes, without particular restrictions, $\alpha$-radiation, $\beta$-radiation, $\gamma$-radiation, X-rays, electron beams, ultraviolet light (UV), visible light, infrared light, and the like, provided that the radiation can provide energy sufficient to cause the generation of initiator species in the inks as a result of irradiation. Among these radiations, ultraviolet light and electron beams are preferred from the standpoint of ease of procurement of devices and curing sensitivity, with ultraviolet light being particularly preferred. Consequently, it is preferable for the ink to be an ink that can be cured by irradiation with ultraviolet light that is used as the radiation.

In this embodiment, when the first printed layer 31 formed by the first ink and the second printed layer 32 formed by the second ink are compared, the first printed layer 31 elongates when heated more than does the second printed layer 32. In addition, the second printed layer 32 has higher elasticity than the first printed layer 31. Consequently, as stated above, the first ink is provided in the first processing region 41 that will be subjected to deformation process, and the second ink is provided in the second processing region 42 that will be subjected to shear processing.

In addition, with the third ink, the third printed layer 33 that is formed by the third ink, as described below, has a specified color, but may or may not have the types of characteristics or functions as the first printed layer 31 or the second printed layer 32. Consequently, the first ink and the second ink will be the focus of descriptions concerning the ink set.

The respective components of the inks will be described below.

(A) Polymerization Initiator

A well-known radical polymerization initiator or a well-known cationic polymerization initiator may be used as the polymerization initiator. One type of polymerization initiator may be used, or two or more types may be used in conjunction. A radical polymerization initiator and a cationic polymerization initiator may be used in conjunction.

The polymerization initiator is a compound that generates polymerization initiator species by absorbing external energy. The external energy that is used in order to initiate polymerization is broadly categorized into heat and activating radiation, and thermal polymerization initiators and photopolymerization initiators may be used respectively. Examples of activating radiation include $\alpha$-radiation, $\beta$-radiation, $\gamma$-radiation, X-rays, electron beams, ultraviolet light, visible light, and infrared light.

In addition, the ink preferably contains a radical polymerization initiator when a radical polymerizable compound is used as the polymerizable compound, whereas the ink preferably contains a cationic polymerization initiator when the polymerizable compound is cationic polymerizable compound.

Radical Polymerization Initiator

Examples of radical polymerization initiators include aromatic ketones, acyl phosphine compounds, aromatic ionium salt compounds, organic peroxides, thio compounds, hexaryl biimidazole compounds, keto oxime ester compounds, borate compounds, azinium compounds, metallocene compounds, active ester compounds, compounds having carbon-halogen bonding, and alkyl amine compounds. The radical polymerization initiator may be individual compounds or combinations of the compounds described above. The radical polymerization initiators may be used individually, or two or more types may be used in conjunction.

Cationic Polymerization Initiator

Examples of cationic polymerization initiators (photoacid generators) include compounds used in chemically sensitized photoresists and in photocationic polymerization (refer to Organic Electronics Materials Research Group, Published by Bunshin Shuppan (1993), pp. 187-192).

Firstly, examples that may be cited include as $B(C_6F_5)_4^-$, $PF_6^-$, $ASF_6^-$, $SbF_6^-$, and $CF_3SO_3^-$ salts of diazonium, ammonium, iodonium, sulfonium, phosphonium and other aromatic onium compounds. Secondly, sulfone compounds that generate sulfonic acid may be cited. Thirdly, halogen compounds that photogenerate hydrogen halides may be used. Fourthly, iron arene complexes may be cited.

In addition, the total used amount of polymerization initiator in the ink is preferably 0.01 to 35 mass % with respect to the total used amount of polymerizable compound, with 0.5 to 20 mass % being preferred, and 1.0 to 20 mass % being additionally desirable. If the amount is 0.01 mass % or greater, then the ink can be sufficiently hardened. At 35 mass % or less, a cured film with a uniform degree of curing can be obtained.

When the sensitizing agent described below is used in the ink, the total used amount of the polymerization initiator is preferably such that the ratio of the polymerization initiator to the sensitizer (by mass) is 200:1 to 1:200, more preferably 50:1 to 1:50, even more preferably 20:1 to 1:5.

(B) Polymerizable Compound

The ink, as described above, contains a polymerizable compound.

The polymerizable compound preferably has a molecular weight of 1000 or less, more preferably 50 to 800, even more preferably 60 to 500.

In addition, a monomer, oligomer, or polymer may be used without particular restrictions, provided that the polymerizable compound is a compound that cures through the excitation of a polymerization reaction such as radical polymerization, cationic polymerization, or anionic polymerization as a result of being provided with some kind of energy. However, it is particularly desirable to use various types of polymerizable compounds that are well known in their use as photopolymerizable compounds and which are made to undergo a polymerization reaction by the initiation species that are generated by the polymerization initiators described above.

In addition, preferred examples of the polymerizable compound are radical polymerizable compounds and cationic polymerizable compounds. Specifically, as the monofunctional polymerizable compound and multifunctional polymerizable compound respectively, it is preferable to use a monofunctional radical polymerizable compound and a multifunctional radical polymerizable compound, or a monofunctional cationic polymerizable compound and a multifunctional cationic polymerizable compound.

Radical Polymerizable Compound

There are no particular restrictions on radical polymerizable compounds, and well-known radical polymerizable compounds may be used. However, it is preferable for the compound to be an ethylenic unsaturated compound (compound having ethylenic unsaturated bonds), more preferably a (meth)acrylate compound, (meth)acrylamide compound, N-vinyl compound, and/or vinyl ether compound, even more preferably, a (meth)acrylate compound and/or an N-vinyl compound. The term "(meth)acrylate" used herein denotes both acrylic and methacrylic compounds.

It is preferable for the monofunctional radical polymerizable compound to be the N-vinyl compound described below, with N-vinyl lactams being additionally preferred.

When a radical polymerizable compound is used as the (b-1) polymerizable compound in the first ink, the first ink preferably contains the N-vinyl compound described below, and more preferably contains an N-vinyl lactam.

The multifunctional radical polymerizable compound is preferably the multifunctional (meth)acrylate compound described below, where "(meth)acrylate" refers to both acrylates and methacrylates.

It is preferable to use a combination of a trifunctional radical polymerizable compound and a radical polymerizable compound having a functionality of 3 or greater, and it is additionally desirable to combine a trifunctional radical polymerizable compound and a trifunctional radical polymerizable compound.

The monofunctional radical polymerizable compound and multifunctional radical polymerizable compound are described below.

Monofunctional Radical Polymerizable Monomer

A monofunctional radical polymerizable compound may be used as the radical polymerizable compound.

Preferred examples of monofunctional radical polymerizable monomers include monofunctional acrylate compounds, monofunctional methacrylates, monofunctional N-vinyl compounds, monofunctional acrylamide compounds, and monofunctional methacrylamide compounds. Monofunctional acrylate compounds, monofunctional methacrylate compounds, and monofunctional N-vinyl compound are additionally preferred examples.

When the first ink contains a monofunctional radical polymerizable monomer, the monofunctional radical polymerizable monomer is preferably a monofunctional acrylate compound and monofunctional N-vinyl compound used in conjunction, or a monofunctional methacrylate compound and a monofunctional N-vinyl compound used in conjunction, more preferably a monofunctional acrylate compound and a monofunctional N-vinyl compound used in conjunction.

It is preferable for the monofunctional radical polymerizable monomer to be a monomer having cyclic structures and only one ethylenic unsaturated double bond selected from the group consisting of an acryloyloxy group, methacryloyloxy group, acrylamide group, methacrylamide group, and N-vinyl group.

In addition, ethylenic unsaturated compounds may be cited as examples of suitable radical polymerizable monomers.

Preferred examples of monofunctional acrylates, monofunctional methacrylates, monofunctional vinyloxy compounds, monofunctional acrylamides, and monofunctional methacrylamides include monofunctional radical polymerizable monomers having groups with cyclic structures such as phenyl groups, naphthyl groups, anthracenyl groups, pyridinyl groups, tetrahydrofurfuryl groups, piperidinyl groups, cyclohexyl groups, cyclopentyl groups, cycloheptyl groups, isobornyl groups, and tricyclodecanyl groups.

Preferred examples of monofunctional radical polymerizable monomers include norbornyl (meth)acrylate, isoboronyl (meth)acrylate, cyclohexyl (meth)acrylate, cyclopentyl (meth)acrylate, cycloheptyl (meth)acrylate, cyclooctyl (meth)acrylate, cyclodecyl (meth)acrylate, dicyclodecyl (meth)acrylate, trimethylcyclohexyl (meth)acrylate, 4-t-butylcyclohexyl (meth)acrylate, acryloylmorpholine, 2-benzyl (meth)acrylate, phenoxyethyl (meth)acrylate, phenoxydiethyleneglycol (meth)acrylate, phenoxytriethyleneglycol (meth)acrylate, EO-modified cresol (meth)acrylate, tetrahydrofurfuryl (meth)acrylate, caprolactone-modified tetrahydrofurfuryl acrylate, nonylphenoxypolyethyleneglycol (meth)acrylate, neopentylglycol benzoate (meth)acrylate, paracumylphenoxyethyleneglycol (meth)acrylate, N-phthalimidoethyl (meth)acrylate, pentamethylpiperidyl (meth) acrylate, tetramethylpiperidyl (meth)acrylate, N-cyclohexyl acrylamide N-(1,1-dimethyl-2-phenyl)ethylacrylamide, N-diphenylmethylacrylamide, N-phthalimidomethylacrylamide, N-(1,1'-dimethyl-3-(1,2,4-triazol-1-yl)) propylacrylamide, and 5-(meth)acryloyloxymethyl-5-ethyl-1,3-dioxacyclohexane.

In addition, it is preferable to use a radical polymerizable monomer having N-vinyl groups and groups with cyclic structures as the monofunctional radical polymerizable monomer. Among these, it is preferable to use N-vinyl lactams such as N-vinylcarbazole, 1-vinylimidazole, and N-vinylcaprolactam, and it is additionally desirable to use N-vinyl lactams.

In addition, the acyclic monofunctional monomers described below may be used as the monofunctional radical polymerizable monomer. The acyclic monofunctional monomers have comparatively low molecular weight and are used, for example, with the objective of decreasing the viscosity of the ink.

Specific examples include octyl (meth)acrylate, 2-ethylhexyl (meth)acrylate, decyl (meth)acrylate, dodecyl (meth) acrylate, tridecyl (meth)acrylate, tetradecyl (meth)acrylate, hexadecyl (meth)acrylate, 2-hydroxyethyl (meth)acrylate, butoxyethyl (meth)acrylate, carbitol (meth)acrylate, 2-ethylhexyldiglycol (meth)acrylate, polyethyleneglycol (meth) acrylate monomethyl ether, polypropyleneglycol (meth)acrylate monomethyl ether, and polytetraethyleneglycol (meth) acrylate monomethyl ether.

Additional examples include (poly)ethyleneglycol mono (meth)acrylate, (poly)ethyleneglycol (meth)acrylate methyl ester, (poly)ethyleneglycol (meth)acrylate ethyl ester, (poly) ethyleneglycol (meth)acrylate phenyl ester, (poly)propyleneglycol mono(meth)acrylate, (poly)propyleneglycol mono (meth)acrylate phenyl ester, (poly)propyleneglycol (meth) acrylate methyl ester, (poly)propyleneglycol (meth)acrylate ethyl ester, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, 2-hydroxyethyl acrylate, butoxyethyl acrylate, tetrahydrofurfuryl acrylate, benzyl acrylate, oligoester acrylate, N-methylol acrylamide, diacetone acrylamide, epoxy acrylate, methyl methacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, alkyl methacrylate, glycidyl methacrylate, benzyl methacrylate, dimethyl aminomethyl methacrylate, and allyl glycidyl ether.

Additional examples include 2-ethylhexyl-diglycol acrylate, 2-hydroxy-3-phenoxypropyl acrylate, 2-hydroxybutyl acrylate, 2-acryloyloxyethyl phthalate, 2-acryloyloxyethyl-2-hydroxyethyl phthalate, ethoxyphenyl acrylate, 2-acryloyloxyethyl succinate, 2-acryloyloxyethyl hexahydrophthalate, lactone-modified plasticized acrylate, butoxyethyl acrylate, 2-hydroxyethyl acrylate, and methoxypropyleneglycol acrylate.

Multifunctional Radical Polymerizable Monomer

A multifunctional radical polymerizable monomer may be used as the radical polymerizable compound.

Preferred examples of the multifunctional radical polymer monomer include multifunctional polymerizable monomers having two or more groups having ethylenic unsaturated double bonds selected from the group consisting of acryloyloxy groups, methacryloyloxy groups, acrylamide groups, methacrylamide groups, vinyloxy groups, and N-vinyl groups. An ink having high cured film strength is obtained as a result of the inclusion of the multifunctional polymerizable monomer.

Examples of multifunctional radical polymerizable monomers having groups with radical polymerizable ethylenic unsaturated bonding include unsaturated carboxylic acids such as itaconic acid, crotonic acid, isocrotonic acid, and maleic acid, and salts thereof, anhydrides having ethylenic unsaturated groups, acrylonitrile, styrene, various types of unsaturated polyesters, unsaturated polyethers, unsaturated polyamides, unsaturated urethane (meth)acrylic monomers or prepolymers, epoxy-based monomers and prepolymers, urethane-based monomers and prepolymers, and other (meth)acrylate esters, and compounds having two or more ethylenic unsaturated double bonds are preferred. Multifunctional (meth)acrylate esters are particularly desirable.

Specific examples include neopentyl glycol di(meth)acrylate, (poly)ethyleneglycol di(meth)acrylate, diethyleneglycol di(meth)acrylate, triethyleneglycol di(meth)acrylate, tetraethyleneglycol di(meth)acrylate, polypropyleneglycol di(meth)acrylate, (poly)tetramethyleneglycol di(meth)acrylate, bisphenol A propylene oxide (PO) di(meth)acrylate adduct, ethoxylated neopentylglycol di(meth)acrylate, propoxylated neopentylglycol di(meth)acrylate, bisphenol A ethylene oxide (EO) di(meth)acrylate adduct, EO-modified pentaerythritol tri(meth)acrylate, PO-modified pentaerythritol tri(meth)acrylate, EO-modified pentaerythritol tetra (meth)acrylate, PO-modified pentaerythritol tetra(meth) acrylate, EO-modified dipentaerythritol tetra(meth)acrylate, PO-modified dipentaerythritol tetra(meth)acrylate, EO-modified trimethylolpropane tri(meth)acrylate, PO-modified trimethylolpropane tri(meth)acrylate, EO-modified tetramethylolmethane tetra(meth)acrylate, PO-modified tetramethylolmethane tetra(meth)acrylate, pentaerythritol tri(meth)acrylate, pentaerythritol tetra(meth) acrylate, dipentaerythritol tetra(meth)acrylate, trimethylolpropane tri(meth)acrylate, tetramethylolmethane tetra(meth)acrylate, trimethylolethane tri(meth)acrylate, trimethylolpropane tri(meth)acrylate, bis(4-(meth)acryloxypolyethoxyphenyl)propane, diallyl phthalate, triallyl trimellitate, 1,6-hexanediol di(meth)acrylate, 1,9-nonanediol di(meth)acrylate, 1,10-decanediol di(meth)acrylate, hydroxypivalic neopentylglycol di(meth)acrylate, tetramethylolmethane tri(meth)acrylate, dimethyloltricyclodecane di(meth)acrylate, modified glycerin tri(meth)acrylate, bisphenol A diglycidyl ether (meth)acrylic acid adduct, modified bisphenol A di(meth)acrylate, caprolactone-modified dipentaerythritol hexa(meth)acrylate, dipentaerythritol hexa(meth)acrylate, pentaerythritol tri(meth)acrylate tolylenediisocyanate urethane prepolymer, pentaerythritol tri (meth)acrylate hexamethylenediisocyanate urethane prepolymer, ditrimethylolpropane tetra(meth)acrylate, pentaerythritol tri(meth)acrylate, and hexamethylenediisocyanate urethane prepolymer. More specifically, any well-known commercially-available or industrial radical polymerizing or crosslinking monomer, oligomer or polymer may be used, as described in "Cross Linking Agent Handbook" by Shinzo Yamashita (Taiseisha, 1981), "UV, EB Hardening Handbook: Ed. by Kiyomi Kato (Kobunshi Kanko-Kai, 1985), "Applications and Market of UV, EB Hardening Technology", page 79, by Radtech Laboratory (CMA, 1989), and "Polyester Resin Handbook" by Eiichiro Takiyama (Japan Daily Industrial News, 1988).

Among these, the following are preferred examples of multifunctional radical polymerizable monomers.

Examples of preferred bifunctional radical polymerizable monomers are ethyleneglycol di(meth)acrylate, diethyleneglycol di(meth)acrylate, triethyleneglycol di(meth)acrylate, tetraethyleneglycol di(meth)acrylate, polyethyleneglycol di(meth)acrylate, propyleneglycol di(meth)acrylate, dipropyleneglycol di(meth)acrylate, tripropyleneglycol di(meth)acrylate, tetrapropyleneglycol di(meth)acrylate, polypropyleneglycol di(meth)acrylate, ethoxylated neopentylglycol diacrylate, and propoxylated neopentylglycol diacrylate.

Examples of preferred trifunctional radical polymerizable monomers include pentaerythritol tri(meth)acrylate and trimethylolpropane tri(meth)acrylate.

In addition, it is preferable to use a vinyl ether compound as the radical polymerizable compound.

The monomers that are cited as examples of the radical polymerizable compound described above have high reactivity, low viscosity, and superior binding with respect to supports.

Cation Polymerizable Compounds

From the standpoint of curing properties and scratch resistance, it is desirable to use oxetane ring compounds and oxirane ring compounds as the cationic polymerizable compound, and modes are additionally preferred that contain both an oxetane ring compound and oxirane ring compound.

The oxirane ring compound ("oxirane compound" below) referred to herein is a compound that contains at least one oxirane ring (oxiranyl group, epoxy group), specifically, which may be suitably selected from among materials that are commonly used as epoxy resins, examples of which include conventional well-known aromatic epoxy resins, alicyclic epoxy resins, and aliphatic epoxy resins. The material may be a monomer, oligomer, or polymer.

In addition, the term "oxetane ring compound" ("oxetane compound" below) refers to a compound containing at least one oxetane ring (oxetanyl group) in its molecules.

The monofunctional cationic polymerizable compound is preferably a monofunctional oxirane compound and/or a monofunctional oxetane compound.

Preferred examples of multifunctional cationic polymerizable compounds are bifunctional cationic polymerizable compounds. In addition, a multifunctional oxirane compound and/or multifunctional oxetane compound are preferred as the multifunctional radical polymerizable compound, and it is additionally desirable to use a multifunctional oxirane compound and multifunctional oxetane compound in conjunction.

The monofunctional cationic polymerizable compound and the multifunctional cationic polymerizable compound are described in detail below.

Examples of the cationic polymerizable compound include the epoxy compounds, vinyl ether compounds, and oxetane compounds described in the publications Japanese Laid-Open Patent Application Publication Nos. 6-9714, 2001-31892, 2001-40068, 2001-55507, 2001-310938, 2001-310937, and 2001-220526.

Examples of monofunctional epoxy compounds include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethyl cyclohexene oxide, 3-acryloyloxymethyl cyclohexane oxide, and 3-vinylcyclohexene oxide.

In addition, examples of multifunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexyl methyl-3', 4'-epoxycyclohexane carboxylate, 2-(3,4-epoxycyclohexyl)-7,8-epoxy-1,3-dioxaspiro[5.5]undecane, bis(3,4-epoxycyclohexylmethyl)adipate, vinylcyclohexene oxide, 4-vinylepoxycylcohexane, bis(3,4-epoxy-6-methylcyclohexylmethyl)adipate, 3,4-epoxy-6-methylcyclohexyl-3',4'-epoxy-6'-methylcyclohexanecarboxylate, methylenebis(3,4-epoxycyclohexane), dicyclopentadiene diepoxide, ethyleneglycol di(3,4-epoxycyclohexylmethyl)ether, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ether, 1,13-tetradecadiene dioxide, limonene dioxide, 1,2,7,8-diepoxyoctane, and 1,2,5,6-diepoxycyclooctane.

Among these epoxy compounds, aromatic epoxides and alicyclic epoxides are preferred from the standpoint of superior curing rates, and alicyclic epoxides are particularly preferred.

Di- or tri-vinyl ether compounds are preferred as the vinyl ether compound from the standpoint of curing, adhesion with respect to supports, and surface hardness of the resulting image, and divinyl ether compounds are particularly preferred.

Oxetane compounds may be freely selected from among well-known oxetane compounds of the type described in the publications Japanese Laid-Open Patent Application Publication Nos. 2001-220526, 2001-310937, and 2003-341217.

Compounds having 1 to 4 oxetane rings in their structures are preferred as the oxetane compound. By using this type of compound, the viscosity of the liquid that is used for ink jet recording can be readily maintained within a range that is desirable for handling, and strong adhesion of the cured ink with respect to supports can also be obtained.

Examples of monofunctional oxetane compounds include 3-ethyl-3-hydroxymethyloxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyldiethyleneglycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenyl(3-ethyl-3- oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, and bornyl(3-ethyl-3-oxetanylmethyl)ether.

Examples of multifunctional oxetane compounds include 3,7-bis(3-oxetanyl)-5-oxanonane, 3,3'-(1,3-(2-methylenyl)propanediylbis(oxymethylene))bis-(3-ethyloxetane)-, 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenylbis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene(3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, PO-modified bisphenol A bis(3-ethyl-3-oxetanylmethyl)ether, EO-modified hydrogenated bisphenol A bis(3-ethyl-3-oxetanylmethyl)ether, PO-modified hydrogenated bisphenol A bis(3-ethyl-3-oxetanylmethyl)ether, and EO-modified bisphenol F (3-ethyl-3-oxetanylmethyl)ether, and other multifunctional oxetanes.

These cationic polymerizable compounds may be used individually, or two or more types may be used in conjunction.

In addition, there are no particular restrictions on the polymerizable compound manufacturing method, and the compounds may be synthesized by well-known methods. In addition, commercially-available products may be used, when available.

(c) Colorant

The ink may contain a colorant in order to enhance the viewability of the image part that has been formed.

The colorant has no particular restrictions, but is preferably a pigment or oil-soluble dye which have excellent color reproducibility and weatherability. The colorant may be selected freely from well-known colorants such as soluble dyes. For colorants that are suitable for use in inks, it is preferable to select compounds that do not function as polymerization inhibitors in the polymerization reaction which occurs as the curing reaction so as not to compromise the sensitivity of the curing reaction to the activating radiation.

There are no particular restrictions on pigments, and the organic and inorganic pigments of the following designations described in the color index, for example, may be used.

Examples of red or magenta pigments include Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36. Examples of blue or cyan pigments include Pigment Blue 1, 15, 15:1, 15:2, 15:3, 15:4, 15:6, 16, 17-1, 22, 27, 28, 29, 36, or 60; examples of green pigments include Pigment Green 7, 26, 36, or 50; examples of yellow pigments include Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193; examples of black pigments include Pigment Black 7, 28, or 26; and examples of white pigments include Pigment White 6, 18, or 21, which may be used in accordance with objectives.

In addition, after adding the colorant to the ink or ink jet recording ink, it is preferable for the colorant to be dispersed at a suitable degree. Dispersion of the colorant may be carried out using various types of dispersion devices, such as a ball mill, a sand mill, an attritor, a roll mill, an agitator, a Henschel mixer, a colloidal mill, an ultrasonic homogenizer, a pearl mill, a wet type jet mill, or a paint shaker.

The colorant, when preparing the ink, may be blended by direct addition along with the respective components. In order to improve dispersibility, however, the colorant may be added to a dispersion medium such as a solvent or radical polymerizable compound in advance, uniformly dispersed and dissolved therein, and then blended.

(d) Dispersant

The ink preferably contains dispersant in order that the pigment is stably dispersed in the ink. High-polymer dispersants are preferred as the dispersant, where the term "high-polymer dispersant" refers to a dispersant with a mass-average molecular weight of 1000 or greater.

Examples of high-polymer dispersants include high-polymer dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (all manufactured by EFKA Additives), and Disperse Aid 6, Disperse Aid 8, Disperse Aid 15, and Disperse Aid 9100 (manufactured by San Nopco Limited); various types of Solsperse dispersants such as Solsperse 3000, 5000, 9000, 12000, 13240, 13940, 17000, 22000, 24000, 26000, 28000, 32000, 36000, 39000, 41000, and 71000 (manufactured by Avecia); Adeka Pluronic L31, F38, L42, L44, L61, L64, F68, L72, P95, F77, P84, F87, P94, L101, P103, F108, L121, and P-123 (manufactured by Adeka Corporation), Isonet S-20 (manufactured by Sanyo Chemical Industries, Ltd.), and Disparlon KS-860, 873SN, and 874 (polymerizable dispersant), #2150 (aliphatic poly carboxylic acid), and #7004 (polyether ester type), manufactured by Kusumoto Chemicals, Ltd.

The content of dispersant in the ink is suitably selected in accordance with the objectives of use, but is preferably 0.05 to 15 mass % with respect to the total mass of the ink.

(e) Other components

Components other than those components described above may be added, as necessary, to the ink.

Examples of other components include sensitizers, co-sensitizers, surfactants, ultraviolet absorbers, antioxidants, anti-fade agents, conductive salts, solvents, high-polymer compounds, basic compounds, polymerization inhibitors, and slip agents.

In addition, leveling additives, matting agents for adjusting film properties, and tackifiers that do not in inhibit polymerization and are added in order to improve adhesion with respect to supports such as a polyolefin or PET may be added as necessary.

Specific examples of tackifiers include the high-molecular-weight tacky polymers described on pp. 5 to 6 of Japanese Laid-Open Patent Application Publication No. 2001-49200 (e.g., esters of alcohols having alkyl groups with carbon numbers of 1 to 20 and (meth)acrylic acid, esters of alicyclic alcohols with carbon numbers of 3 to 14 and (meth)acrylic acid, and copolymers formed from esters of aromatic alcohols with carbon numbers of 6 to 14 and (meth)acrylic acid), and low-molecular-weight tackifying resins having polymerizable unsaturated bonds.

The printing device that is used in the production of the printed material 1 is described below.

Printing Device

As described in FIG. 2, the printing device (printed material production device) 1a is a device that discharges radiation-curing ink onto a base material 30 and irradiates the discharged radiation-curing ink with radiation, thereby curing the radiation-curing ink and creating various types of designs, text, or numerals on the base material 30.

The printing device 1a has a configuration that comprises a base stand 2 that carries the base material 30, a transport device 3 that transports the base material 30 on the base stand 2 in the X-direction in FIG. 2, a droplet discharge head (not shown) that discharges radiation-curing ink, a carriage 4 that is provided with a plurality of droplet discharge heads, and a conveyance device 5 that moves in the Y-direction which is perpendicular to the X-direction. The transport device 3 and the conveyance device 5 in this embodiment constitute a movement device whereby the base material 30 and the carriage 4 are made to undergo relative motion in the X-direction and the Y-direction.

The transport device 3 has a configuration that comprises a work stage 6 and a stage movement device 7 that are provided on the base stand 2. The work stage 6 is provided so that it can move in the X-direction on the work stand 2 by the stage movement device 7. In the production steps, the base material 30 that is transported from the transport device (not shown) that is disposed upstream from the printing device 1a is held on the XY plane by a vacuum chucking mechanism, for example. The stage movement device 7 is provided with a bearing mechanism such as a ball screw or linear guide and has a configuration whereby it moves the work stage 6 in the X-direction based on a stage position control signal that represents the X-coordinate of the work stage 6 and is input from a control device 8.

As shown in FIGS. 3 and 4, the carriage 4 has the form of a square plate and is movably attached to the conveyance device 5. A plurality (10 in this embodiment) of droplet discharge heads (film formation devices) 9 are retained on the bottom surface 4a in a state whereby they are aligned in the Y-direction.

The plurality of droplet discharge heads 9 (9Y, 9C, 9M, 9K, 9W) described below are provided with a large number (plurality of) nozzles, and thus radiation-curing ink droplets are discharged based on the drive control signal and graphic data that is input from the control device 8. In addition, these droplet discharge heads 9 (9Y, 9C, 9M, 9K, 9W) respectively discharge radiation-curing inks corresponding to Y (yellow), C (cyan), M (magenta), K (black), as well as radiation-curing ink corresponding to clear or white (W), and tubes (pipes) 10 are connected to the respective droplet discharge heads 9 via the carriage 4 as shown in FIG. 2. Of the 10 droplet discharge heads 9, the 5 droplet discharge heads 9 on the left side in FIG. 3 are used for discharging droplets of a first ink, and the 5 droplet discharge heads 9 on the right side in FIG. 3 are used for discharging droplets of a second ink. For discharge of the third ink in this embodiment, of the 10 droplet discharge heads 9a, a droplet discharge head is 9 is used that discharges ink of a color that is different from the first ink and the second ink. As shall be apparent, 5 additional droplet discharge heads 9 may be provided for discharging droplets of the third ink.

A first tank 11Y for loading and storing radiation-curing ink for the color Y (yellow) is connected via a tube 10 to the droplet discharge head 9Y corresponding to the color Y (yellow), so that the radiation-curing ink for the color Y (yellow) can thereby be supplied from the first tank 11Y to the droplet discharge head 9Y.

Similarly, a second tank 11C that is filled with radiation-curing ink corresponding to the color C (cyan) is connected to the droplet discharge head 9C corresponding to the color C (cyan), a third tank 11M that is filled with radiation-curing ink for the color M (magenta) is connected to the droplet discharge head 9M corresponding to the color M (magenta), a fourth tank 11K filled with radiation-curing ink for the color K (black) is connected to the droplet discharge head 9K corresponding to the color K (black), and a fifth tank 11W that is filled with radiation-curing ink for the color W (transparent) is connected to the droplet discharge head 9W corresponding to the color W (transparent or white, in this case, transparent). As a result of this type of configuration, corresponding radiating-curing inks can be supplied to the respective droplet discharge heads 9.

The droplet discharge heads 9Y, 9C, 9M, 9K, 9W, the tube (pipe) 10, or the tanks 11Y, 11C, 11M, 11K, and 11W are provided with heating means such as a heater (not shown) for the systems of the respective colors (Y, C, M, K, W). Specifically, for the respective color systems, at least one of the droplet discharge head 9, the tube 10, or the tank 11 is provided with a heating means for increasing flowability by decreasing the viscosity of the radiation-curing ink. As a result, the radiation-curing ink is adjusted so that the discharge properties from the droplet discharge head 9 are favorable.

Thus, the radiation-curing ink, as described above, is a type of ink that cures by absorbing radiation of a prescribed wavelength, such as an ultraviolet-curing ink. Radiation-curing inks normally have different wavelengths of the absorbed radiation (ultraviolet light) depending on their components (blends), and thus the optimal value of curing wavelength or the optimal curing wavelength will differ for each ink.

Figure 5A:
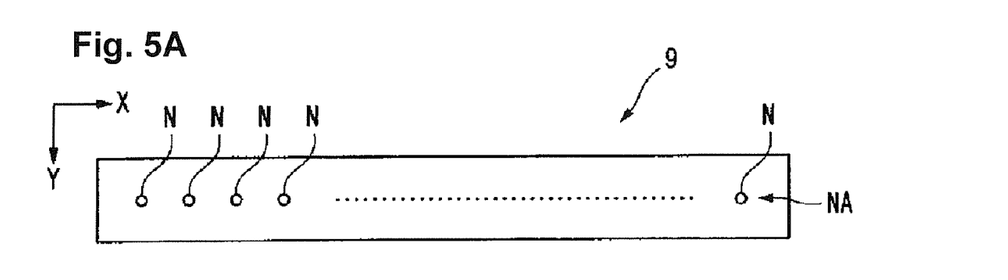
FIGS. 5A to 5C are schematic configuration diagrams of the droplet discharge head.
Figure 5B:
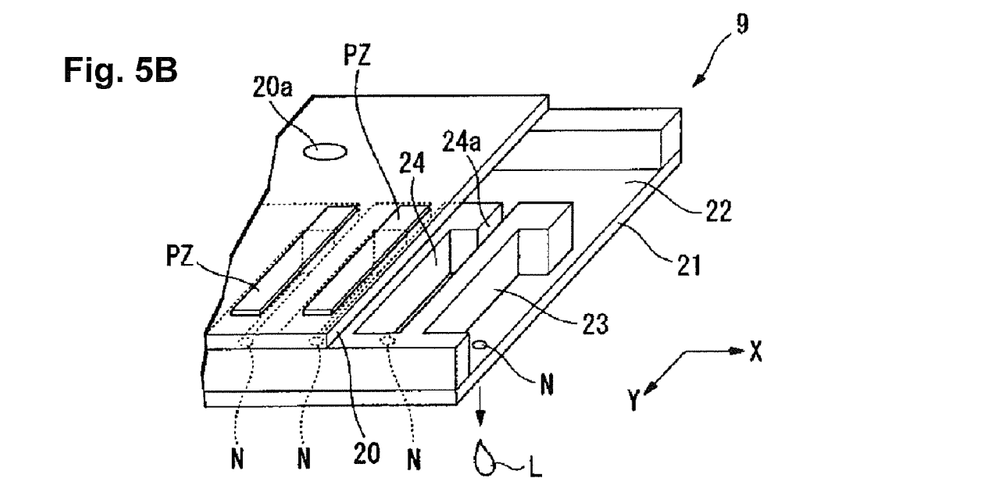
Figure 5C:
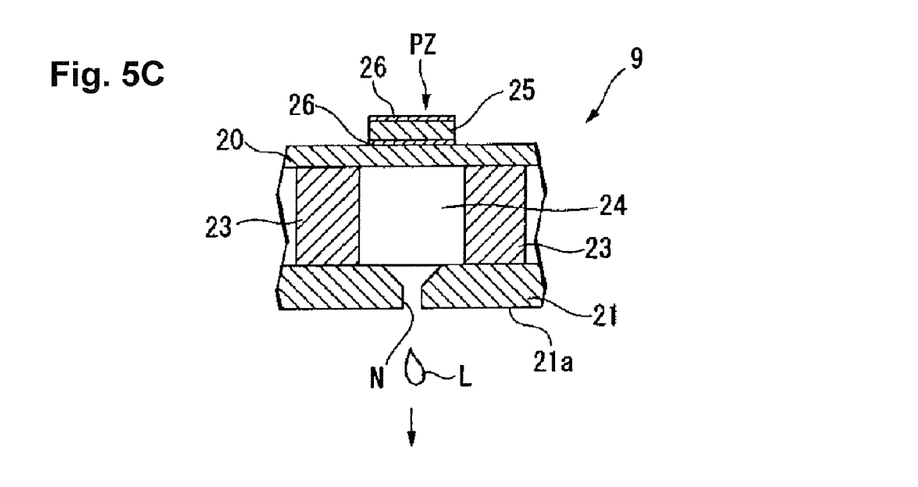

FIG. 5 is a schematic configuration diagram of the droplet discharge head 9. FIG. 5A is a plan view of the droplet discharge head 9 as seen from the side of the work stage 6, FIG. 5B is a partial perspective view of the droplet discharge head 9, and FIG. 5C is a partial sectional view showing one nozzle of the droplet discharge head 9 of FIG. 5C.

As shown in FIG. 5A, the droplet discharge head 9 has a plurality (e.g., 180) nozzles N that are aligned in a direction that is perpendicular to the Y direction, specifically, the X-direction in this embodiment, thereby forming a plurality of nozzle rows NA from the plurality of nozzles N. In the drawing, one row of nozzles is shown, but the number of nozzles rows and number of nozzles provided on the droplet discharge head 9 can be changed as desired. For example, a plurality of nozzle rows NA that are aligned in the X direction may be provided in the Y direction.

In addition, as shown in FIG. 5B, a configuration is used that comprises a vibration plate 20 that is provided with a material supply hole 20a that is connected to the tube 10, a nozzle plate 21 on which the nozzles N are provided, a reservoir (liquid reservoir) 22 that is provided between the vibration plate 20 and the nozzle plate 21, a plurality of partitioning walls 23, and a plurality of cavities (liquid chambers) 24. The surface (bottom surface) of the nozzle plate 21 constitutes a nozzle surface 21a on which the plurality of nozzles N are formed. A piezoelectric element (drive element) PZ is disposed opposite each nozzle N on the vibration plate 20. The piezoelectric element PZ comprises, for example, a piezo element.

Radiation-curing ink that is supplied via the material supply hole 20a fills the reservoir 22. The cavities 24 are formed so that the vibration plates 20 and the nozzle plates 21 are surrounded by pairs of partitioning walls 23 and are provided in a one-to-one correspondence with the nozzles N. In addition, radiation-curing ink is introduced into each of the cavities 24 from the reservoir 22 via the supply openings 24a that are provided between the pairs of partitioning walls 23.

In addition, as shown in FIG. 5C, the piezoelectric element PZ has a configuration in which a piezoelectric material 25 is sandwiched by a pair of electrodes 26, and the piezoelectric material 25 is made to contract by applying drive signals to the pair of electrodes 26. Consequently, the vibration plate 20 on which the piezoelectric element PZ is disposed bends outwards (towards the side opposite from the cavity 24) while being integrally connected with the piezoelectric element PZ, so that the volume of the cavity 24 increases.

Thus, the radiation-curing ink flows through the supply opening 24a from the liquid reservoir 22 in correspondence with the increase in volume of the cavity 24. In addition, when application of the drive signal to the piezoelectric element PC is then stopped after this state has been reached, the piezoelectric element PZ and the vibration plate 20 both return to their original shapes, and the cavity 24 also returns to its original volume. As a result, the pressure on the radiation-curing ink in the cavity 24 increases, causing discharge of a droplet L of the radiation-curing ink from the nozzle N towards the base material 30.

The droplet discharge head 9 having this type of configuration is disposed so as to protrude from the bottom surface 4a, with the bottom surface of the nozzle plate 21, specifically, the surface NS on which the nozzles are formed (nozzle surface), facing downward from the bottom surface 4a of the carriage 4 as shown in FIG. 3.

In addition, as shown in FIGS. 3 and 4, radiation discharge means 12 are disposed adjacently on both sides on the carriage 4 sandwiching the plurality of aligned droplet discharge heads 9 (10 in the drawing). Specifically, the radiation discharge means 12 are respectively disposed on both sides in the direction of alignment of the droplet discharge heads 9 that are aligned in the Y direction.

These radiation discharge means 12 are used for curing the radiation-curing ink and thus comprise a plurality of light-emitting diodes (LEDs) in this embodiment. However, in the present invention, the radiation discharge means 12 are not limited to LEDs, provided that they can emit radiation of a wavelength that accelerates polymerization of the radiation-curing ink. Additional examples that may be used as the radiation discharge means 12 include laser diodes (LDs), mercury lamps, metal halide lamps, xenon lamps, and excimer lamps. For example, when ultraviolet-curing ink is used as the radiation-curing ink, various light sources that emit ultraviolet light may be used.

The radiation discharge means 12 that is composed of LEDs in this embodiment discharges radiation that has a wavelength range that includes the optimal wavelength for the radiation-curing ink that is discharged by the droplet discharge head 9. In other words, as described above, the various radiation-curing inks presumably have different optimal curing wavelengths depending on their components (blends). However, irradiation with light having the optimal curing wavelength for each of the radiation-curing inks occurs when irradiation is carried out using the type of radiation described above.

As shown in FIG. 2, the conveyance device 5 that moves the carriage 4, for example, has a suspended structure that spans the base stand 2, and thus a bearing mechanism such as a ball screw or linear guide is provided in the Z direction that is perpendicular to the Y direction and the XY plane. As a result of this mechanism, the conveyance device 5 causes the carriage 4 to move in the Y direction while also moving in the Z direction based on the carriage position control signal representing the Y-coordinate and the Z-coordinate of the carriage 4 that is input from the control device 8.

The control device 8 outputs a stage position control signal to the stage movement device 7, a carriage position control signal is output to the conveyance device 5, and graphical data and a drive control signal are output to the drive circuit substrate (not shown) of the droplet discharge head 9. As a result, in order to bring about relative motion between the base material 30 and the carriage 4, the control device 8 performs synchronous control of the positioning operation for the base material 30 involving movement of the work stage 6 and the positioning operation for the droplet discharge head 9 involving movement of the carriage 4. In addition, by carrying out the droplet discharge operation at the droplet discharge head 9, droplets of radiation-curing ink are distributed at prescribed positions on the base material 30. The control device 8 carries out radiation emission operations at the radiation discharge means 12 in addition to droplet discharge operations at the droplet discharge head 9.

The printing device 1a is configured as described above.

Next, the printed material 1 will be described.

As shown in FIG. 1, the printed material 1 has a first printed layer 31, a second printed layer 32, and a third printed layer 33 that are provided directly or indirectly on the base material 30. In this embodiment, the printed material 1 has a base material 30; a first printed layer 31 produced by printing with a first ink and a second printed layer 32 produced by printing with a second ink, which have different characteristics or functionalities and different colors from each other, and which are provided in mutually different regions on the base material 30; and a third printed layer 33 that is formed by printing with a third ink that has a different color from the first printed layer 31 and the second printed layer 32 and which is provided so that it covers or fills boundary between the first printed layer 31 and the second printed layer 32. The first printed layer 31 is provided in a section where work is to be performed for deforming the base material 30, specifically, in a first processing region 41 which is the section where deformation process is to be performed, and the second printed layer 32 is provided in a second processing region 42 which is the section where shear processing is to be performed. By providing the third printed layer 33, the first printed layer 31 and the second printed layer 32 can be separated, thereby allowing the same color to be seen in the first printed layer 31 and the second printed layer 32 in cases where there is a small color difference between the first printed layer 31 and the second printed layer 32 as described below. As shall be apparent, there may be no color difference between the first printed layer 31 and the second printed layer 32.

There are no particular restrictions on the constituent material for the base material 30, and examples include various types of resins, various types of glass, and various types of metals. However, resin materials are preferred from the standpoint of allowing deformation.

There are no particular restrictions on resin materials, and examples include polyethylene, polypropylene, ethylene-propylene copolymer, ethylene-vinyl acetate copolymer (EVA) and other polyolefins, cyclic polyolefins, modified polyolefins, polyvinyl chloride, polyvinylidene chloride, polystyrene, polyamide, polyimide, polyamide imide, polycarbonate, poly(4-methylpentene-1), ionomer resins, acrylic resins, polymethyl methacrylate, acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyethylene terephthalate (PET), polybutylene terephthalate (PBT), polycyclohexane terephthalate (PCT) and other polyesters, polyether, polyether ketone (PEK), polyether ether ketone (PEEK), polyether imide, polyacetal (POM), polyphenylene oxide, modified polyphenylene oxide, polysulfonate, polyether sulfone, polyphenylene sulfide, polyarylate, aromatic polyester (liquid crystal polymer), and the like, or copolymers, blends, and polymer alloys having these compounds as primary components. These compounds may be used individually or in combinations of two or more types (e.g., as a laminate of two or more layers).

In addition, when a configuration is used in which the printed material 1 is to be viewed from the side of the base material 30, the base material 30 is made transparent. When a configuration is used in which the printed material 1 is to be viewed from the opposite side from the base material 30, specifically, from the side of the first printed layer 31, the second printed layer 32, and the third printed layer 33, the base material 30 may be transparent or non-transparent.

As shown in FIG. 1A, the printed material 1, prior to working, has a first processing region 41 for deformation process, and a second processing region 42 for shear processing. Specifically, the printed material 1 subsequent to working as shown in FIG. 1B has been subjected to deformation process in the first processing region 41 and has been subjected to shear processing in the second processing region 42. The printed material of the present invention includes both the printed material 1 prior to work as shown in FIG. 1A and the printed material 1 that has been worked, as shown in FIG. 1B.

Examples of deformation process include work in which part of the material is elongated, as with constriction work and bending work. In the configuration shown in the drawings, a bottomed cylindrical section is formed by constriction work in the first processing region 41 of the printed material 1.

In addition, for example, punching and clipping may be cited as examples of shear processing. In the configuration shown in the drawings, holes are formed by punching in the second processing region 42 of the printed material 1.

The pencil hardness of the first printed layer 31 is preferably B or greater, more preferably B to 4H. As a result, the first processing region 41 is conducive to deformation process.

In addition, the pencil hardness of the second printed layer 32 is preferably H or greater, more preferably H to 5H. As a result, the second processing region 42 is amenable to shear processing.

The color difference between the first printed layer 31 and the second printed layer 32 as determined by a colorimeter (color difference meter) is preferably 2 or less, more preferably 1 or less, even more preferably 0.1 to 1. As a result, the first printed layer 31 and the second printed layer 32 will be seen to be the same color when a slight separation is provided between the first printed layer 31 and the second printed layer 32.

In addition, it is preferable for the first printed layer 31 and the second printed layer 32 to contain colorants having the same color, and it is preferable for them to contain the same colorants. As a result, the color difference between the first printed layer 31 and the second printed layer 32 as measured by a colorimeter will be as described above.

In order for the first printed layer 31 and second printed layer 32 to have different characteristics, the compositions of the polymerizable compounds will be different. As a result, even if colorants having the same color or the same colorants are used, the first printed layer 31 and the second printed layer 32 will be different colors.

The first printed layer 31 and the second printed layer 32 may be in contact or may be disposed with a separation. In this embodiment, however, the first printed layer 31 and the second printed layer 32 are in contact. Thus, the third printed layer 33, as viewed from the direction in which the printed material 1 is to be seen, is provided so as to cover the interface between the first printed layer 31 and the second printed layer 32. Specifically, the direction in which the printed material 1 is viewed is from the side that is opposite from the base material 30, and the third printed layer 33 is provided on the first printed layer 31 and the second printed layer 32 so that it covers the interface between the first printed layer 31 and the second printed layer 32, as seen from the side that is opposite from the base material 30. The interface between the first printed layer 31 and the second printed layer 32 refers to the gap between the first printed layer 31 and the second printed layer 32 when the first printed layer 31 and the second printed layer 32 are disposed with a separation.

The third printed layer 33 produces a color difference of 3 or greater when the third printed layer 33 and the first printed layer 31 are measured by a colorimeter and produces a color difference of 3 or greater when the third printed layer 33 and the second printed layer 32 are measured by a color difference meter. As a result, it can be recognized that the third printed layer 33 is a different material than the first printed layer 31 and second printed layer 32, and the first printed layer 31 and the second printed layer 32 thus can be made to appear as the same color by separating the first printed layer 31 and the second printed layer 32.

The third printed layer 33 may be the same color as the first printed layer 31 or the second printed layer 32 or may be a different color. However, it is preferable for the layer to be a different color from the first printed layer 31 and the second printed layer 32. As a result, it can be more clearly recognized that the third printed layer 33 is a different material from the first printed layer 31 and the second printed layer 32. The first printed layer 31 and the second printed layer 32 thus can be made to appear as the same color by separating the first printed layer 31 and the second printed layer 32.

The third printed layer 33 may have the same or different transparency relative to the first printed layer 31 or the second printed layer 32, but it is preferable for the layer to have higher transparency than the first printed layer 31 and the second printed layer 32. As a result, the third printed layer 33 will be more prominent, and it can be more clearly recognized that the third printed layer 33 is different from the first printed layer 31 and the second printed layer 32. As a result, the first printed layer 31 and the second printed layer 32 thus can be made to appear as the same color by separating the first printed layer 31 and the second printed layer 32.

In addition, the width w of the third printed layer 33 is preferably 0.35 mm or greater, more preferably 10 mm or greater. As a result, the first printed layer 31 and the second printed layer 32 can be separated at a level whereby the first printed layer 31 and the second printed layer 32 will be recognized as the same color.

The first printed layer 31, the second printed layer 32, and the third printed layer 33 are respectively formed by printing. In this embodiment, the first printed layer 31, the second printed layer 32, and the third printed layer 33 are each formed by affixing (applying) ink by an ink jet method using the printing device 1a. Specifically, the first printed layer 31 is produced by discharging and supplying a first ink as droplets from a nozzle N using an ink jet method, followed by irradiation with radiation to bring about curing. In addition, the second printed layer 32 is produced by discharging and supplying a second ink as droplets from a nozzle N using an ink jet method, followed by irradiation with radiation to bring about curing. In addition, the third printed layer 33 is produced by discharging and supplying a third ink as droplets from a nozzle N using an ink jet method, followed by irradiation with radiation to bring about curing.

There are no particular restrictions on the printed material 1, and examples that may be cited include internal automobile parts such as speedometers, external electrical product parts, masks, and signage.

A method for manufacturing the printed material 1 is described below.

The printing device 1a described above is used for manufacturing the printed material 1.

First, as shown in FIG. 2, the base material 30 is mounted on the work stage 6.

Next, the printing device 1a is operated, and a first ink is discharged and affixed to a region for forming the first printed layer 31 on the base material 30, and a second ink is discharged and affixed to a region for forming the second printed layer 32. The first ink and the second ink that have been affixed are then irradiated with irradiation by the radiation discharge means 12, thereby being cured to form the first printed layer 31 and the second printed layer 32.

Next, a third ink is discharged and affixed to the region for forming the third printed layer 33 on the first printed layer 31 and the second printed layer 32. In addition, the third ink that has been affixed is then irradiated with radiation by the radiation discharge means 12, thereby being cured to form the third printed layer 33.

Next, deformation process, specifically, constriction work, is carried out on the first processing region 41 on which the first printed layer 31 has been provided, thus manufacturing a bottomed cylindrical section. This constriction work is carried out while heating the first processing region 41.

In addition, shear processing, specifically, punching work, is carried out on the second processing region 42 that has been provided with the second printed layer 32, thereby forming openings.

The constriction work that is carried out on the first processing region 41 or the punching work that is carried out on the second processing region 42 may be performed first.

As described above, in accordance with this printed material 1, cracking, breaking, rupture, and the like can be prevented in the first processing region 41, and the material is thus well-suited to deformation process. In addition, cracking, breaking, defects, and the like can be prevented in the second processing region 42, and the material is thus well-suited to shear processing.

Moreover, by providing the third printed layer 33, separation can be provided between the first printed layer 31 and the second printed layer 32, so that the first printed layer 31 and the second printed layer 32 can be made to appear as the same color.

The printed material and the printed material manufacturing method of the present invention were described above based on the embodiment that is presented in the drawings, but the invention is not restricted by this embodiment, and the configurations of various parts can be replaced by any desired configuration that has a similar function. In addition, other constituent materials and steps may be added as desired to the present invention.

Moreover, in the present invention, the first printed layer and the second printed layer may be disposed with a separation, and the third printed layer may be provided so that it fills the gap between the first printed layer and the second printed layer.

In the embodiment described above, the printed material has a first printed layer that is formed from a first ink, a second printed layer that is formed from a second ink, and a third printed layer that is formed from a third ink. However, the present invention may also have a fourth printed layer that is formed from a fourth ink. Specifically, the printed layers are not restricted to three types, and four or more types may be provided.

In addition, in the present invention, the third printed layer may be omitted.

EXAMPLES

Specific examples of the present invention are described below.

Inks, Printed Layers

The inks of compositions 1 to 12 shown in Table 1 below were respectively prepared.

The respective inks of compositions 1 to 12 were used and were discharged and supplied from nozzles as droplets onto a polycarbonate base material using an ink jet method, followed by irradiation with ultraviolet light to bring about curing and to form the printed layers.

With the respective printed layers, the punch work properties and elongation ratio were evaluated in the manner described below. The results are shown in Table 1.

Punch Work Properties

A mold for circular punching was used, and the printed layers and base materials were punched. Evaluations were carried out as described below.

⊚: No change in external appearance in the punched part.

○: Thin cracks in the punched part, but no breaking or defects.

Δ: Significant cracking in the punched part.

x: Breaking or defects in the punched part.

Elongation Ratio

First, the length L1 of the printed layer was determined

Next, the printed layer was heated to 150° C., the printed layer was pulled along with the base material, and the length L2 of the printed layer was determined when cracking occurred in the printed layer or immediately prior to rupture of the printed layer.

The elongation ratio of the printed layer was then determined from the following formula.

Elongation ratio (%) = $(L2-L1)/L1$

TABLE 1

| | | | Composition | | | | | |
|---|---|---|---|---|---|---|---|---|
| | | | 1 | 2 | 3 | 4 | 5 | 6 |
| Reaction component (mass %) | N-vinylcaprolactam (BASF) | Monofunctional monomer | 15.0 | 15.0 | 15.0 | 15.0 | 15.0 | 10.0 |
| | Phenoxyethyl acrylate V#192 (Osaka Yuki) | Monofunctional monomer | 53.6 | 45.6 | 37.0 | 31.0 | 29.0 | 30.0 |
| | Trimethylolpropane triacrylate SR351S (Sartomer) | Multifunctional monomer | 0.0 | 3.0 | 3.0 | 10.0 | 11.0 | 15.0 |
| | Pentaerythritol triacrylate PET3A (Osaka Organic Chemical) | Multifunctional monomer | 0.0 | 5.0 | 13.6 | 12.6 | 13.6 | 13.6 |
| Photopolymerization initiator (mass %) | Irgacure 819 (Chiba Specialty Chemical) | | 4.0 | 4.0 | 4.0 | 4.0 | 4.0 | 4.0 |
| | Darocur TPO (Ciba Specialty Chemical) | | 5.0 | 5.0 | 5.0 | 5.0 | 5.0 | 5.0 |
| Slip agent (mass %) | BYK-UV3500 (BYK) | | 0.2 | 0.2 | 0.2 | 0.2 | 0.2 | 0.2 |
| Polymerization inhibitor (mass %) | p-Methoxyphenol (Kanto Chemical) | | 0.15 | 0.15 | 0.15 | 0.15 | 0.15 | 0.15 |
| Pigment (mass %) | Titanium oxide | | 20.0 | 20.0 | 20.0 | 20.0 | 20.0 | 20.0 |
| Dispersant (mass %) | Solsperse 36000 | | 2.0 | 2.0 | 2.0 | 2.0 | 2.0 | 2.0 |
| | Total | | 100.0 | 100.0 | 100.0 | 100.0 | 100.0 | 100.0 |
| Punch work properties | | | X | X | X | X-Δ | X-Δ | X-Δ |
| Elongation | | | ~200% | ~200% | ~200% | ~200% | ~150% | ~150% |
| | | Monofunctional monomer (mass %) | 68.6 | 60.6 | 52.0 | 46.0 | 44.0 | 40.0 |
| | | Multifunctional monomer (mass %) | 0.0 | 8.0 | 16.6 | 22.6 | 24.6 | 28.6 |
| | | Ratio (Y/X) | 0.0 | 0.132 | 0.319 | 0.491 | 0.559 | 0.715 |

| | | | Composition | | | | | |
|---|---|---|---|---|---|---|---|---|
| | | | 7 | 8 | 9 | 10 | 11 | 12 |
| Reaction component (mass %) | N-vinylcaprolactam (BASF) | Monofunctional monomer | 3.6 | 10.0 | 6.0 | 4.0 | 2.3 | 0.0 |
| | Phenoxyethyl acrylate V#192 (Osaka Yuki) | Monofunctional monomer | 30.0 | 13.6 | 5.0 | 2.0 | 1.0 | 0.0 |
| | Trimethylolpropane triacrylate SR351S (Sartomer) | Multifunctional monomer | 20.0 | 40.0 | 44.0 | 49.0 | 49.8 | 53.6 |
| | Pentaerythritol triacrylate PET3A (Osaka Organic Chemical) | Multifunctional monomer | 15.0 | 5.0 | 13.6 | 13.6 | 15.5 | 15.0 |
| Photopolymerization initiator (mass %) | Irgacure 819 (Chiba Specialty Chemical) | | 4.0 | 4.0 | 4.0 | 4.0 | 4.0 | 4.0 |
| | Darocur TPO (Ciba Specialty Chemical) | | 5.0 | 5.0 | 5.0 | 5.0 | 5.0 | 5.0 |
| Slip agent (mass %) | BYK-UV3500 (BYK) | | 0.2 | 0.2 | 0.2 | 0.2 | 0.2 | 0.2 |
| Polymerization inhibitor (mass %) | p-Methoxyphenol (Kanto Chemical) | | 0.15 | 0.15 | 0.15 | 0.15 | 0.15 | 0.15 |
| Pigment (mass %) | Titanium oxide | | 20.0 | 20.0 | 20.0 | 20.0 | 20.0 | 20.0 |
| Dispersant (mass %) | Solsperse 36000 | | 2.0 | 2.0 | 2.0 | 2.0 | 2.0 | 2.0 |
| | Total | | 100.0 | 100.0 | 100.0 | 100.0 | 100.0 | 100.0 |
| Punch work properties | | | Δ | ○ | ⊚ | ⊚ | ○ | Δ |
| Elongation | | | ~100% | ~50% | ~50% | ~50% | ~50% | ~50% |
| | | Monofunctional monomer (mass %) | 33.6 | 23.6 | 11.0 | 6.0 | 3.3 | 0.0 |

TABLE 1-continued

|  | | | | | | |
|---|---|---|---|---|---|---|
| Multifunctional monomer (mass %) | 35.0 | 45.0 | 57.6 | 62.6 | 65.3 | 68.6 |
| Ratio (Y/X) | 1.04 | 1.91 | 5.24 | 10.43 | 19.79 | — |

The printed layers formed using the ink of composition 1 and the ink of composition 2 each had little multifunctional monomer or no multifunctional monomer and thus had poor solvent resistance.

Example 1

The ink of composition 1 was used and was discharged and supplied as droplets from a nozzle using an ink jet method in a first processing region of a polycarbonate base material. The ink was then irradiated with and cured by ultraviolet light to form a first printed layer. In addition, the ink of composition 7 was used and was discharged and supplied as droplets from a nozzle using an ink jet method in a second processing region of the base material. The ink was then irradiated with and cured by ultraviolet light to form a second printed layer. A printed material was thus obtained.

Examples 2 to 24

Printed materials were produced in the same manner as in Example 1, with the exception that the ink was changed as shown in Tables 2 and 3.

Comparative Examples 1 to 12

Printed materials were produced in the same manner as in Example 1, with the exception that the ink was changed as shown in Table 3.

The Examples and comparative examples described above were evaluated regarding punch work properties in the second printed layer of the second processing region and regarding elongation ratio in the first printed layer of the first processing region. The results are presented in Tables 2 and 3.

TABLE 2

|  | First Printed Layer | Second Printed Layer | Evaluation | |
|---|---|---|---|---|
|  |  |  | Elongation ratio | Punch Work properties |
| Example 1 | Composition 1 | Composition 7 | ~200% | Δ |
| Example 2 | Composition 1 | Composition 8 | ~200% | ○ |
| Example 3 | Composition 1 | Composition 9 | ~200% | ⊚ |
| Example 4 | Composition 1 | Composition 10 | ~200% | ⊚ |
| Example 5 | Composition 1 | Composition 11 | ~200% | ○ |
| Example 6 | Composition 1 | Composition 12 | ~200% | Δ |
| Example 7 | Composition 2 | Composition 7 | ~200% | Δ |
| Example 8 | Composition 2 | Composition 8 | ~200% | ○ |
| Example 9 | Composition 2 | Composition 9 | ~200% | ⊚ |
| Example 10 | Composition 2 | Composition 10 | ~200% | ⊚ |
| Example 11 | Composition 2 | Composition 11 | ~200% | ○ |
| Example 12 | Composition 2 | Composition 12 | ~200% | Δ |
| Example 13 | Composition 3 | Composition 7 | ~200% | Δ |
| Example 14 | Composition 3 | Composition 8 | ~200% | ○ |
| Example 15 | Composition 3 | Composition 9 | ~200% | ⊚ |
| Example 16 | Composition 3 | Composition 10 | ~200% | ⊚ |
| Example 17 | Composition 3 | Composition 11 | ~200% | ○ |
| Example 18 | Composition 3 | Composition 12 | ~200% | Δ |
| Example 19 | Composition 4 | Composition 7 | ~200% | Δ |
| Example 20 | Composition 4 | Composition 8 | ~200% | ○ |

TABLE 3

|  | First Printed Layer | Second Printed Layer | Evaluation | |
|---|---|---|---|---|
|  |  |  | Elongation ratio | Punch Work properties |
| Example 21 | Composition 4 | Composition 9 | ~200% | ⊚ |
| Example 22 | Composition 4 | Composition 10 | ~200% | ⊚ |
| Example 23 | Composition 4 | Composition 11 | ~200% | ○ |
| Example 24 | Composition 4 | Composition 12 | ~200% | Δ |
| Comparative Example 1 | Composition 1 | Composition 1 | ~200% | X |
| Comparative Example 2 | Composition 2 | Composition 2 | ~200% | X |
| Comparative Example 3 | Composition 3 | Composition 3 | ~200% | X |
| Comparative Example 4 | Composition 4 | Composition 4 | ~200% | X-Δ |
| Comparative Example 5 | Composition 5 | Composition 5 | ~150% | X-Δ |
| Comparative Example 6 | Composition 6 | Composition 6 | ~150% | X-Δ |
| Comparative Example 7 | Composition 7 | Composition 7 | ~100% | Δ |
| Comparative Example 8 | Composition 8 | Composition 8 | ~50% | ○ |
| Comparative Example 9 | Composition 9 | Composition 9 | ~50% | ⊚ |
| Comparative Example 10 | Composition 10 | Composition 10 | ~50% | ⊚ |
| Comparative Example 11 | Composition 11 | Composition 11 | ~50% | ○ |
| Comparative Example 12 | Composition 12 | Composition 12 | ~50% | Δ |

As is clear from Tables 2 and 3, favorable results were obtained in each of the Examples in regard to punch work properties and elongation ratio.

In contrast, the punch work properties were extremely poor in Comparative Examples 1 to 3, the punch work properties were poor in Comparative Examples 4 to 6, the elongation ratio was low in Comparative Example 7, and the elongation ratio was extremely low in Comparative Examples 8 to 12.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printed material comprising:
    a base material having a first processing region where deformation process is to be performed and a second processing region where shear processing is to be performed;
    a first printed layer that is provided in the first processing region on the base material and is imprinted using a first curable ink containing at least a monofunctional polymerizable compound among a monofunctional polymerizable compound and a multifunctional polymerizable compound;
    a second printed layer that is provided in the second processing region on the base material and is imprinted with a second curable ink containing at least a multifunctional polymerizable compound among a multifunctional polymerizable compound and a monofunctional polymerizable compound; and
    a third printed layer that is provided to cover boundary between the first printed layer and the second printed layer using a third curable ink that has a different color from the first printed layer and the second printed layer,
    in the first curable ink, y1/x1 being 0.5 or less, where x1 and y1 are respective masses of the monofunctional polymerizable compound and the multifunctional polymerizable compound in the first curable ink, and
    in the second curable ink, y2/x2 being 1 or greater, where x2 and y2 are respective masses of the monofunctional polymerizable compound and the multifunctional polymerizable compound in the second curable ink.

2. The printed material according to claim 1, wherein the first printed layer has a pencil hardness of B or greater.

3. The printed material according to claim 1, wherein the second printed layer has a pencil hardness of H or greater.

4. The printed material according to claim 1, wherein the first processing region has been deformed by the deformation process.

5. The printed material according to claim 1, wherein the second processing region has been sheared by the shear processing.

6. The printed material according to claim 1, wherein the first curable ink is discharged and supplied as droplets from a nozzle using an ink jet method to form the first printed layer, and
    the second curable ink is discharged and supplied as droplets from a nozzle using the ink jet method to form the second printed layer.

7. The printed material according to claim 1, wherein the first curable ink and the second curable ink are radiation-curable inks,
    the first printed layer is obtained by discharging and supplying the first curable ink from a nozzle using an ink jet method, and curing the first curable ink under irradiation with radiation, and
    the second printed layer is obtained by discharging and supplying the second curable ink from a nozzle using an ink jet method, and curing the second curable ink under irradiation with radiation.

* * * * *